US011975321B2

(12) United States Patent
Dugan et al.

(10) Patent No.: US 11,975,321 B2
(45) Date of Patent: May 7, 2024

(54) MULTI-CHANNEL OPTICAL DETECTION SYSTEM AND METHOD FOR MULTI-CHAMBER ASSAYS

(71) Applicants: Lawrence C. Dugan, Modesto, CA (US); William J. Benett, Livermore, CA (US); Elizabeth K. Wheeler, Livermore, CA (US)

(72) Inventors: Lawrence C. Dugan, Modesto, CA (US); William J. Benett, Livermore, CA (US); Elizabeth K. Wheeler, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 237 days.

(21) Appl. No.: 16/367,125

(22) Filed: Mar. 27, 2019

(65) Prior Publication Data

US 2019/0299209 A1    Oct. 3, 2019

Related U.S. Application Data

(60) Provisional application No. 62/648,847, filed on Mar. 27, 2018.

(51) Int. Cl.
*B01L 3/00* (2006.01)
*G01N 21/76* (2006.01)

(52) U.S. Cl.
CPC ........ *B01L 3/502715* (2013.01); *G01N 21/76* (2013.01); *B01L 2200/10* (2013.01)

(58) Field of Classification Search
CPC .......... B01L 3/502715; B01L 2200/10; B01L 2300/1827; B01L 2300/0864;
(Continued)

(56) References Cited

U.S. PATENT DOCUMENTS 5,585,069 A    12/1996  Zanzucchi et al.
5,639,428 A     6/1997  Cottingham
(Continued)

OTHER PUBLICATIONS

Dugan, Larry, "Bio ID; A rapid and portable system for microbial identification", Lawrence Livermore National Laboratory, Technology & Market Discovery Webinar Series, Mar. 28, 2017 <https://www.youtube.com/watch?v=JNWjT_SGs98>.
(Continued)

*Primary Examiner* — Matthew D Krcha
*Assistant Examiner* — Sophia Y Lyle
(74) *Attorney, Agent, or Firm* — James S. Tak

(57) ABSTRACT

A multi-channel optical detection system includes a base unit adapted to receive a multi-chamber assay cartridge having a plurality of reaction chambers loaded with a sample and an optical detection reagent, and an optical detection unit having a multi-channel optical block having a plurality of detection channels each with an associated light source, and an optic sensor. The optical detection unit is connectable to the base unit so that interrogation ports of the detection channels are optically aligned with optically transparent windows of the reaction chambers of a loaded cartridge, so that upon initialization, light sources are activated to interrogate reaction products in the reaction chambers and detect the optical responses therefrom.

11 Claims, 8 Drawing Sheets

(58) Field of Classification Search
CPC .............. B01L 2200/027; G01N 21/76; G01N 2021/6482; G01N 2021/0325; G01N 21/0332; G01N 21/6452
See application file for complete search history.

(56) References Cited

U.S. PATENT DOCUMENTS

| | | | |
|---|---|---|---|
| 5,882,903 | A | 3/1999 | Andrevski et al. |
| 6,300,138 | B1 | 10/2001 | Gleason et al. |
| 6,730,883 | B2 | 5/2004 | Brown et al. |
| 6,949,377 | B2 | 9/2005 | Ho |
| 7,122,153 | B2 | 10/2006 | Ho |
| 9,795,968 | B2 | 10/2017 | Dugan |
| 2005/0093087 | A1 | 5/2005 | Kadel |
| 2005/0214161 | A1 | 9/2005 | Gupta |
| 2009/0142745 | A1 | 6/2009 | Breidenthal et al. |
| 2010/0105577 | A1* | 4/2010 | Dugan .............. B01L 3/502746 506/39 |
| 2012/0033210 | A1* | 2/2012 | Kolesnychenko ......................... G01N 21/6452 356/246 |
| 2012/0115214 | A1* | 5/2012 | Battrell .............. G01N 21/6456 435/287.2 |
| 2015/0024477 | A1 | 1/2015 | Mori et al. |
| 2015/0298129 | A1* | 10/2015 | Dugan ................ B01L 3/50851 435/286.1 |
| 2015/0308578 | A1 | 10/2015 | Block |

OTHER PUBLICATIONS

Dukes, et al., "Novel Reverse Transcription Loop-Mediated Isothermal Amplification For Rapid Detection of Foot-and-Mouth Disease Virus", Arch Virol., 151:1093-1106 (2006).

Kurosaki, et al., "A Simple and Sensitive Method For Detection of Bacillus Anthracis by Loop-Mediated Isothermal Amplification", Journal of Applied Microbiology, 107, pp. 1947-1956 (2009).

Bearinger, et al., "Development and Initial Results of a Low Cost, Disposable, Point-of-Care Testing Device for Pathogen Detection", IEEE Transactions on Biomedical Engineering, vol. 58, pp. 805-808 (2011).

Torres, et al., "LAVA: An Open-Source Approach to Designing LAMP (Loop-Mediated Isothermal Amplification) DNA Signatures", BMC Bioformatics, 12:240, 7 pages (2011).

* cited by examiner

MULTI-CHANNEL OPTICAL DETECTION SYSTEM AND METHOD FOR MULTI-CHAMBER ASSAYS

CROSS-REFERENCE TO RELATED APPLICATIONS

This application claims the benefit of U.S. provisional application No. 62/648,847 filed Mar. 27, 2018, which is incorporated by reference herein.

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

TECHNICAL FIELD

The present invention is generally directed to assays, especially biological assays e.g. for nucleic acid amplification, and more particularly to a multi-channel optical detection system and method for identifying biological organisms by optical detection, e.g. fluorescence, colorimetric, etc., of multi-chamber assays without the need for sample preparation, and, in the case of nucleic acid amplification assays, nucleic acid purification/isolation.

BACKGROUND

Biological assays often require extensive sample preparation. For example, nucleic acid amplification and detection typically requires extensive sample preparation and nucleic acid extraction procedures utilizing laboratory equipment, followed by amplification of the extracted nucleic acid and detection of the amplification product which requires additional equipment. Detection of nucleic acid without extensive sample preparation simplifies the process and shortens the time from sample to answer. This may allow more rapid detection of naked nucleic acid, genetic markers or pathogenic microorganisms in clinical, food testing, agricultural, environmental and field samples.

For example, Loop-mediated isothermal amplification (LAMP) is one example technique that does not require extensive sample prep or nucleic acid isolation. LAMP was first described in the article "Loop-mediated Isothermal Amplification of DNA" by Notomi, et al., 2000, Nuc Ac Res, 28(12):e63, and is an isothermal technique which amplifies a target sequence at a constant temperature using either two or three sets of primers, and a DNA polymerase with high strand displacement activity in addition to replication activity (e.g. DNA polymerase from Bacillus stearothermophilus (Bst pol), which has optimal activity at 60-65° C.). Typically, LAMP utilizes four different primers: forward and reverse outer primers, F3 and B3 respectively, and forward and reverse inner primers, FIP and BIP, respectively, that target six distinct sequences on the template nucleic acid. The addition of reverse transcriptase into the reaction, termed reverse-transcription LAMP or RT-LAMP, allows for the detection of RNA templates under the same conditions. Additionally, the addition of loop primers was subsequently shown to increase the rate of the reaction, reducing overall amplification times significantly (Nagamine, et al., 2002, Mol Cell Probes, 16:223-229). Thus, a complete set of LAMP primers includes: outer primers F3 and B3, inner primers FIP and BIP, and forward and reverse loop primers, LF and LB, respectively.

Various detection methods have been reported for LAMP, including turbidity, fluorescence and gel electrophoresis (reviewed in Parida, 2008, Rev Med Virol, DOI: 10.1002/rmv.593). Additionally, colorimetric detection of positive LAMP reactions using Hydroxynaphthol blue dye (HNB) was described in an article by Goto, et al., 2009, Biotechn, 46(3): 167-172. Solutions of HNB undergo a color change as cation levels drop (Brittain 1978, Analyt Chim Acta, 96:165-170). LAMP reactions generate a significant amount of pyrophosphate byproduct as supplied 2'-Deoxyribonucleotide-5'-Triphosphates (dNTPs) are added to amplification product. The pyrophosphate bonds with free $Mg^{2+}$ in the reaction mixture, reducing the cation level. This results in the solution undergoing a purple to blue color change easily detectable with the human eye.

Recently, several groups have published LAMP assays for the detection of B. anthracis (Qiao, et al., 2007, Biotechnol Lett, 29:1939-1946; Kurosaki 2009; Hatano, et al., 2010, Jpn J Infect Dis, 63:36-40; Jain, et al., 2011, World J Microbiol Biotechnol, 27: 1407-1413). Qiao and coworkers originally reported detection of three gene targets representing the B. anthracis plasmids, pXO1 (pag) and pXO2 (capB), along with a chromosome target (Ba813) using LAMP. They reported a lower limit of detection of 10 spores (Qiao 2007) using fluorescence and gel electrophoresis. Kurosaki, et al. reported detection of three B. anthracis target genes (pag, capB, and sap), again representing the two plasmids and chromosome, respectively. They reported a limit of detection for pag of 10 fg per reaction in ~30 min using purified DNA and real-time turbidity detection (Kurosaki 2009). Additionally, they reported detecting target DNA from spores isolated from blood of intra-nasally infected mice (Kurosaki 2009). Hatano and coworkers reported detecting 1000 copies of pag and capB target DNA using LAMP along with a low-cost pocket warmer as a heating source (Hatano 2010). Most recently, DNA isolated from spores spiked into soil and talcum powder was detected by LAMP targeting the pag gene on pXO1 (Jain 2011). Previous reports describing the detection of B. anthracis using LAMP have all used isolated DNA as template, whether extracted using phenol/chloroform (Hatano 2010), commercial kits (Kurosaki 2009) or boiling of spores (Qiao 2007, Kurosaki 2009, Jain 2011). These procedures produce quality DNA preparations suitable for PCR and LAMP, but require a minimum of 1 hour to perform and laboratory equipment such as tabletop centrifuges capable of speeds >10K RPM. Researchers recently showed direct detection of nucleic acid from solid and liquid cultures of B. anthracis without time consuming nucleic acid extraction and purification (Dugan et al. 20012, J Microbiol Methods, 90:280-284). Cultures were either loaded directly into the reaction mixture or diluted in buffer and then loaded into the reaction.

There is therefore a need for a multi-channel optical detection system and method capable of optical detection for identifying biological organisms without the need sample preparation and, in the case of nucleic acid amplification assays, nucleic acid purification/isolation. And in one example application, there is a need for a multi-channel optical detection system and method adapted to optically detect fluorescing reaction products of a heated sample.

SUMMARY

Generally, the present invention is directed to a multi-channel optical detection system (alternatively, platform, device, or kit) and method, for providing real-time optical detection (e.g. fluorescence, colorimetric, etc.) and identification of reaction products of a fluidic sample that is loaded into, and in some applications heated in, multiple reaction chambers, and provides performance enhancements over the multi-chamber nucleic acid and amplification and detection device disclosed in U.S. Pat. No. 9,795,968, which is incorporated by reference herein in its entirety.

The system and method of the present invention may be used for various applications, such as for example nucleic acid amplification, pathogen identification, antibody-based testing, chemical agent detection, chemical detection, and explosives detection, among others. For nucleic acid amplification in particular, the system and method of the present invention may be used for identifying, in situ or at point-of-care, genetic markers of, for example, biological threat organisms (e.g. *B. anthracis*) and/or other pathogens in fluid samples by visually detecting associated DNA and/or RNA by fluorescence, without the need for sample preparation and nucleic acid isolation. It is appreciated that fluidic samples interrogated by the present invention may be environmental/in-field, laboratory and clinical samples.

The system and method of the present invention may be generally characterized as including three main units: a disposable multi-chamber assay cartridge having a plurality of reaction chambers; a base unit adapted to receive the cartridge on a cartridge-mounting section of the base unit, and optionally having a heating element in certain embodiments); and an optical detection unit having a plurality of independent optical detection channels, to which the present invention may be directed individually and/or in any combination.

Multi-Chamber Assay Cartridge

The multi-chamber assay cartridge of the present invention generally includes a cartridge body having a plurality of independent reaction chambers or wells, and a sample loading chamber fluidically connected to the reaction chambers via corresponding reaction chamber entry ports. In an example embodiment, the reaction chambers are fluidically connected to the sample loading port by corresponding fluidic channels in a hub-and-spoke configuration similar to that described in U.S. Pat. No. 9,795,968.

Each reaction chamber contains (e.g. pre-loaded with) an optical detection reagent, which is a compound which produces a visually detectable change (e.g. fluorescing, colorimetric, etc.) upon reacting with a target substance. Example optical detection reagents may include, for example, one or more of the following: redox dyes, DNA intercalating dyes, quantum dots, nanoparticles, fluorescent probes and substrates that are degraded by enzymes yielding fluorescent products, hydroxynaphthol blue, picogreen dye, sybr green dye, eva green dye, ethidium bromide, etc. It is notable that the optical detection reagent can a non-fluorescing compound that could be detected optically. These would be molecules that change color due to, for example, pH change, a change in cation or anion level, etc. There are also other optical detection schemes, such as color change, that could potentially be detected with the system.

Depending on the application and/or the nature of the sample to be tested, it is appreciated that an optical detection reagent may be used alone, or optionally in combination with any additional reagent(s) necessary to perform a specific test. For example, in the case of nucleic acid amplification applications, such as for isothermal amplification, DNA oligo primers may be used, including for example LAMP primers which are designed to identify each of eight target organisms: *Bacillus anthracis, Yersinia pestis, Francisella tularensis, Clostridium botulinum*, Castor bean extract, Variola major/pox family, *Brucella suis/Brucella* spp. and *Staphylococcus aureus*. And still other reagents may include, for example, one or more of the following: buffer (ThermoPol reaction buffer (NEB, Ipswich, MA); deoxyribonucleotides; betaine; magnesium sulfate; bst polymerase water; protease inhibitors; and lyophilization stabilizers. For non-amplification applications other non-amplification reagents may also be used to induce other types of reactions, such as for example enzymatic reactions that use fluorescence to detect biomolecules, such as when detecting for pathogens in water samples. Various examples of these include, for example, beta-galactosidase and beta-D-glucuronidase assays, that can be performed by adding a substrate that is modified by the enzyme generating a fluorescent product. Another example of a non-amplification application is to track microbial growth. In particular microbial growth media may be added to the reaction wells along with a redox dye to track microbial growth, with or without antimicrobials present. This particular application would use the heating and fluorescence capabilities of the system of the present invention, but the reagent would not be an amplification reagent. In an example embodiment, the reaction chambers are pre-loaded/filled with reagents prior to final assembly of the cartridge. Additionally, the pre-loaded reagents may be lyophilized. As such, the cartridge may be labeled with an expiration date.

And each reaction chamber is adapted to receive a portion of a sample to be interrogated and tested. In particular, the multi-chamber cartridge also includes a valved sample loading port that is adapted to simultaneously fluidically connect with and be opened by a sample loading device or implement, so that a liquid sample contained in the sample loading device may be delivered through the sample loading port and into each of the reaction chambers.

In an example embodiment, the valved sample loading port is a sample-loading piston valve, having a piston or plunger arranged to move with a linear motion in a reciprocating chamber or cylinder to control fluidic access into the reaction chambers via the sample loading chamber and the entry ports. The sample-loading piston valve includes a tubular column extending from the cartridge body to an open end for receiving the sample, and a tubular plunger in fluidic communication with the open end of the tubular column. In particular, the tubular plunger is adapted to move with a linear motion in the tubular column between an occluded position blocking fluidic access from the open end of the tubular column to the sample loading chamber, and a non-occluded position enabling fluidic access from the open end of the tubular column to the sample loading chamber. A resiliently biasing member is also provided for urging the tubular plunger from the non-occluded position to the occluded position. And sample-loading piston valve also includes a flexible diaphragm that is arranged to gate access to the entry ports from the sample loading chamber. In particular, the flexible diaphragm is arranged to be actuated by the tubular plunger so that actuation of the tubular plunger to the non-occluded position simultaneously actuates the flexible diaphragm to open access to the entry ports, and actuation of the tubular plunger to the occluded position simultaneously actuates the flexible diaphragm to close access to the entry ports.

And in another example embodiment, the tubular column is adapted (e.g. threaded) to connect a Luer-Lock-type syringe to the open end, and the tubular plunger is positioned to be actuated from the occluded position to the non-occluded position upon connecting the Luer-Lock-type syringe to the open end. In this embodiment, loading a sample into the cartridge involves removing a cap covering the opening of the tubular column (shown as a central pillar of the cartridge) and mounting a sample-loaded device, such as a liquid sample-filled Luer lock syringe, onto the tubular column at the open end. The twisting action to connect the syringe actuates the tubular plunger (i.e. depresses the piston located within the central pillar) from the occluded position to a non-occluded position. In particular, the tapered nozzle of the Luer lock syringe comes in contact with the shank portion of the tubular plunger to urge downward movement of the tubular plunger from the occluded position to the non-occluded position. This downward action simultaneously compresses the resiliently biasing member (e.g. foam pad) and actuates the flexible diaphragm downward to open the entry ports leading into the reaction chambers, to thereby allow access to the reaction chambers. A fluidic sample present in the syringe may then be injected into the sample loading chamber to allow the sample to flow through the tubular plunger, through the sample loading chamber, through the entry ports, and into the reaction wells to mix with the optical detection reagent and any additional reaction components contained therein. Once all reaction wells are filled with sample, the syringe is removed. Removal of the syringe allows the resiliently biasing member to return to its original shape, resulting in a return of the deformed flexible diaphragm (e.g. a silicon diaphragm) to its original shape and the tubular plunger to its original occluded position. This action also results in resealing the fluidic channels leading to the reaction chambers by closing the entry ports and preventing liquid flow from the wells to the sample loading chamber and vice versa.

In an example embodiment, foam vents (i.e. release channels containing expandable foam inserts) may also be provided and located at the outer edge of each reaction chamber/well to allow air present in the reaction chambers to exit the cartridge as the chambers fill with liquid sample. And foam inserts are provided in the foam vents to expand upon contact with the liquid sample after each reaction well fills to seal the release channel and prevent any additional air or liquid flow out of the release channel. This results in a slight pressure increase that prevents additional fluid entering the reaction well. Additionally, the present invention may include certain design features to prevent air from getting trapped in the assay wells after liquid sample loading, which trapped air can move up from the bottom of the well after the foam vent has sealed and cause a large air bubble at the top of the well. Possible solutions to release any air in assay wells may include locating a vent port to the well top or bottom of the well and/or locating the sample flow channel to either the top or bottom of the well. In one example embodiment, a linear slope/ramp is provided leading into the reaction chamber coming from the central sample loading chamber to prevent air from getting trapped.

The reaction chambers also have optically transparent windows view ports for viewing reaction progress and optically detecting reaction products produced in the reaction chambers following sample loading (and optionally heating). The multiple reaction chambers may be used for simultaneous optical detection of multiple reaction products (e.g. target genetic sequences of target organisms) and reaction positive and negative controls. For example, the cartridge may have ten to twenty reaction chambers, one for each listed target, a negative control chamber and a reaction-positive chamber. It is appreciated that the reaction chambers may be provided, for example, as cavities integrally formed in the cartridge body, or in the alternative as separately-formed structures connected to and carried by the cartridge body. And the cartridge body may have any other body shape suitably dimensioned to be received in a base unit of the present invention. In an example embodiment, the cartridge body has a disc-shaped configuration, design or construction, with the reaction chambers arranged in a circular arrangement in the cartridge body surrounding the sample loading chamber in a hub-and-spoke configuration.

The cartridge body and the optically transparent windows covering the reaction chambers may be constructed using various types of materials (transparent materials for the windows), such as for example, various types of plastics, Teflon/PTFE, polypropylene (PP), polystyrene (PS), polylactic acid (PLA), nylon, polyethylene, polyurethane, acrylonitrile butadiene styrene (ABS), epoxy resin, phenolic resin, silica, etc. Preferably the cartridge body is made of a material that does not leach chemicals known to inhibit or otherwise negatively affect colorimetric or fluorescence detection (or amplification reaction for amplification applications), and/or are high impact resistance plastics which will not fracture into sharp pieces. And the reaction chambers (i.e. chamber/well walls and the optically transparent windows) also preferably has a construction designed for long-term storage of lyophilized reagents, especially if reagents are pre-loaded in the reaction chambers.

Base Unit

The base unit of the optical detection system of the present invention is particularly configured and adapted to receive the multi-chamber assay cartridge on a cartridge-loading section of the base unit so that optically transparent windows of the reaction chambers are outward facing. In some example embodiments where the base unit includes a heating element or sub-elements, the cartridge-loading section is adapted to receive the cartridge so that the reaction chambers of the loaded cartridge are in thermal communication with the heating element to heat the reaction chambers and its contents, while visual changes to the contents of the reaction chambers are viewable by the optical detection unit through the optically transparent view ports of the cartridge. In an example embodiment, a guide pin(s) located in the base unit may be used to align with a guide hole present in the cartridge (or vice versa) allowing reproducible alignment each time a cartridge is loaded.

Where a heating element is provided for a heating operation, the base unit also includes a heating controller for controlling the heating element and its start and stop times, as well as an onboard power source (battery) or an off-board power source connector for powering the heating element. In this manner, the heating controller may be used to maintain an optimum reaction temperature(s) across the reaction chambers. An activation switch may be provided for initiating the heating controller to heat the reaction chambers, and optionally, an indicator light may also be provided. The base unit may, for example, be suitably dimensioned for handheld use and portability. In an example embodiment, the heating element may include a thin-film Kapton heater having a two or more gold or copper wire tracings and sandwiched between two copper or aluminum plates or affixed to a single copper or aluminum plate. The copper or aluminum plate that is in contact with the cartridge would snuggly fit the cartridge providing maximum contact between metal and plastic. Input from a resistance temperature detector (RTD) sensor may be used by the heating controller to control the temperature of the Kapton heater and the copper plates. Components mounted onto a printed circuit board (PCB) control the heating process. Power is provided by a rechargeable Li ion battery mounted in the base of the housing below the heater and PCB. Other embodiments could incorporate a heating element that is located in the optical detection unit and over a cartridge mounted in the base unit, or provide a combination of heating elements above and below the cartridge, as part of the optical detection and the base unit, respectively.

Optical Detection Unit

And the optical detection unit generally includes the following: a multi-channel optical block having a plurality of detection channels each with an interrogation port on a cartridge-interface side of the multi-channel optical block; a plurality of light sources (e.g. LEDs) each optically connected to a corresponding one of the detection channels to transmit an interrogating light beam out through the corresponding interrogation port; a plurality of optic sensors each optically connected to a corresponding one of the detection channels to detect an optical response entering from the corresponding interrogation port; and a detection controller operably connected to control the light sources and the optic sensors. Each detection channel, its corresponding interrogation port, its corresponding light source, and its corresponding optic sensor may be characterized together as an optical detection sub-unit or functional group because they function together as a single unit, independently of other similar groups. Furthermore, the optical detection unit is adapted to connect to the base unit so that the cartridge-interface side of the multi-channel optical block is juxtaposed with the loaded cartridge, and for each detection channel the interrogation port is optically aligned with the optically transparent window of a corresponding one of the reaction chambers of the loaded cartridge and, upon activation of the light source, the interrogating light beam is directed into the reaction chamber to interrogate reaction products found therein and the optical response from the reaction products is detected by the optic sensor. In this manner, the optical detection unit is adapted to be positioned over a cartridge that is loaded on the base unit and connected to the base unit so that a plurality of optical detection paths or channels of the optical detection unit are aligned and associated with the reaction chambers of the cartridge on a one-to-one basis. It is appreciated that an optical connection enables optical communication and transmission of electromagnetic waves, whereby a light source optically connected to a detection channel is enabled to transmit light through the detection channel.

In an example embodiment, the multi-channel optical block has a cylindrical configuration with a cylindrical sidewall between a first end that is the cartridge-interface side and an opposite second end, and the detection channels are arranged in a circular arrangement in the cylindrical sidewall corresponding to a circular arrangement of the reaction chambers in the cartridge. And in another example embodiment, the optical detection unit includes a plurality of dichroic mirrors each arranged in a corresponding one of the detection channels to reflect the interrogating light beam from the light source out through the interrogation port, and to transmit the optical response entering from the interrogation port to the optic sensor. And the light sources are arranged to direct the interrogating light beam in a radially inward direction toward the dichroic mirror, and the optic sensors are arranged to receive the optical response in an orthogonal direction to the interrogating light beam. It is appreciated that in an alternative arrangement, the light sources and optic detectors may be positioned on the same side of the multi-channel optical block that is opposite the cartridge-interface side.

For fluorescent detection application, an example embodiment additionally includes a plurality of excitation and emission filters where each excitation filter is optically connected to a corresponding one of the detection channels downstream of the corresponding light source to transmit excitation light of a predetermined fluorescence-inducing wavelength range out through the corresponding interrogation port, and where each emission filter is optically connected to a corresponding one of the detection channels upstream of the corresponding optic sensor to detect fluorescent light of a predetermined fluorescence wavelength range entering from the corresponding interrogation port. As noted, the bandpass excitation filter is positioned in front, i.e. downstream, of the LED. Excitation light from the LED passes through this filter and is diverted by the dichroic mirror/beam splitter to the sample (and its reaction products) present in the cartridge reaction well. The optical response, i.e. fluorescent light, emitted from the sample passes through a focusing mirror, if needed, mounted at the bottom of the optical detection unit directly above the sample reaction well. The emitted light then passes through the dichroic beam splitter and a bandpass or longpass emission filter, before being measured by the optic sensor, i.e. a light-to-digital signal detector. It is appreciated that excitation filter is an optical filter for selecting the excitation wavelength of light from a light source, and an emission filter is an optical filter which is translucent only for light with a predetermined wavelength range, e.g. the optical response, e.g. fluorescent light, emitted by a sample's reaction products.

The detection controller of the optical detection unit is provided to initialize a detection operation, and to control activation and operation of the light sources (e.g. LEDs) and the optic sensors (i.e. light-to-digital signal detectors), and may be programmed into PCB-mounted controller components. It is notable that each light source may be turned on independently or in groups, and similarly each optic sensor may be turned on independently or in groups. The timing for turning the LEDs on and off can be preset. The optical sensor collects signal over a predetermined amount of time corresponding to the powering on of its associated LED. In an example embodiment the light sources are activated in parallel, and the optic sensors detect fluorescent light in parallel. For the detection operation, the optical detection unit, and in particular digital processors and/or controllers thereof, may be configured to take optical readings (e.g. fluorescence, colorimetric, etc.) on a predetermined time interval. Additionally, data from the optical detection unit may be analyzed in real time, such as by an onboard processor, and/or simultaneously stored in a memory chip on the PCB for future analysis offboard. Various communication capabilities (e.g. USB, Wi-Fi or Bluetooth) may also be provided on the system to download data from the control board memory. The system may be set to automatically shut off after a predetermined time. The results for each of the reactions from the reaction chambers may then be visualized together, such as for example, on an electronic display mounted in the housing lid of the optical detection unit.

It is notable that each of the optical detection unit and the base unit may include protective housing structures for housing the respective components of the base and optical detection units, and may include a base portion for housing components of the base unit, and a lid or cover portion for housing components of the optical detection unit. In particular the base portion may house the heating and power components and cartridge-loading section of the base unit, including for example the heating element, the heating controller (i.e.g a heater control printed circuit board (PCB), a rechargeable Li ion battery and a DC power connector power jack for charging the battery, and the lid portion for housing the optical detection components of the optical detection unit, including for example, the detection controller (detection control PCB) and a display screen.

Various connection configurations may be used to connect the optical detection unit and the base unit together, such by hinge connection or maintained as separate connectable units. In particular, the base portion and lid portion of the housing can be attached, such as for example, via a rotating locking mechanism, a snapping lock, a clamp, an external or internal hinge, or by a combination of pins and/or magnets. In an example embodiment the lid portion of the optical detection unit is hinged to the base unit and has a latch for securely connecting the optical detection unit to the base unit. In another example embodiment, guide pins are used to align the lid of the optical detection unit to the base portion of the base unit. In both cases magnets may be used to hold the lid portion on the base portion of the housing structure. Communication between the optical detection unit and the base unit may accomplished, for example, using a flexible ribbon cable or spring-loaded contact connectors, also known as Pogo pins. And the housing can be made from various materials, such as for example, plastics, such as Delrin, and metals, such as for example aluminum and stainless steel. A knurled aluminum ring may be mounted to the lid to provide an improved gripping surface for gloved hands. In another example embodiment, the optical detection unit could be mounted in the base unit below the heating element, without the use of a separate lid of cover portion. In this instance the heating element would have central holes below each cartridge well allowing interrogating light into and optical response out of the reaction chambers of the cartridge.

The system may be configured so that a predetermined trigger event causes activation of the system and initiates optical detection operations by the detection controller, and, if provided, by the heating controller. For example, the system may be configured so that positioning and preferably connecting the optical detection unit on or to the base unit while a cartridge is installed on the base unit will trigger activation of the system. For this purpose, a switch or switches may be used and located on a control board of the optical detection unit and/or on a control board of the base unit for detecting the trigger event. For some embodiments having a heating element for heating the reaction chambers, the trigger event may also activate the heating element to initiate heating of the reaction chambers and its contents, e.g. to a predetermined temperature, prior to starting the detection operations. A signal will also be sent to the optical detection unit control PCB to begin measuring fluorescence from the cartridge reaction wells. The system automatically shuts off after a predetermined time. Placing the housing lid on the housing base when no cartridge has been loaded will not activate the system.

One aspect of the present invention includes an optical detection system for use with a multi-chamber assay cartridge having a plurality of reaction chambers, wherein each reaction chamber contains an optical detection reagent, is adapted to receive a portion of a sample, and has an optically transparent window for viewing reaction products produced therein, comprising: a base unit having a cartridge-loading section adapted to receive the cartridge; and an optical detection unit including: a multi-channel optical block having a plurality of detection channels each with an interrogation port on a cartridge-interface side of the multi-channel optical block; a plurality of light sources each optically connected to a corresponding one of the detection channels to transmit an interrogating light beam out through the corresponding interrogation port; a plurality of optic sensors each optically connected to a corresponding one of the detection channels to detect an optical response entering from the corresponding interrogation port; and a detection controller operably connected to control the light sources and the optic sensors, wherein the optical detection unit is adapted to connect to the base unit so that the cartridge-interface side of the multi-channel optical block is juxtaposed with the loaded cartridge, and for each detection channel the interrogation port is optically aligned with the optically transparent window of a corresponding one of the reaction chambers of the loaded cartridge and, upon activation of the light source, the interrogating light beam is directed into the reaction chamber to interrogate reaction products found therein and the optical response from the reaction products is detected by the optic sensor.

In an example embodiment, the optical detection system described above may also include one or more of the following: wherein the multi-channel optical block has a cylindrical configuration with a cylindrical sidewall between a first end that is the cartridge-interface side and an opposite second end, and the detection channels are arranged in a circular arrangement in the cylindrical sidewall corresponding to a circular arrangement of the reaction chambers in the cartridge; and wherein the optical detection unit includes a plurality of dichroic mirrors each arranged in a corresponding one of the detection channels to reflect the interrogating light beam from the light source out through the interrogation port, and to transmit the optical response entering from the interrogation port to the optic sensor, and wherein the light sources are arranged to direct the interrogating light beam in a radially inward direction toward the dichroic mirror, and the optic sensors are arranged to receive the optical response in an orthogonal direction to the interrogating light beam.

In another example embodiment, the optical detection system described above may also include one or more of the following: wherein the detection controller is adapted to initialize a detection operation of the optical detection unit, including activating the light sources, upon detecting a trigger event; wherein the trigger event includes detecting that a cartridge is loaded on the cartridge-loading section and the optical detection unit is connected to the base unit; wherein the base unit has a heating element, the cartridge-loading section is adapted to receive the cartridge so that the reaction chambers of the loaded cartridge are in thermal communication with the heating element, and the base unit has a heating controller adapted, upon detecting the trigger event, to activate the heating element and heat the reaction chambers prior to the detection controller initializing the detection operation of the optical detection unit; and wherein the trigger event includes detecting that a cartridge is loaded on the cartridge-loading section and the optical detection unit is connected to the base unit.

In another example embodiment, the optical detection system described above may also include the following: wherein the optical detection unit includes a plurality of excitation filters each optically connected to a corresponding one of the detection channels downstream of the corresponding light source to transmit excitation light of a predetermined fluorescence-inducing wavelength range out through the corresponding interrogation port, and a plurality of emission filters each optically connected to a corresponding one of the detection channels upstream of the corresponding optic sensor to detect fluorescent light of a predetermined fluorescence wavelength range entering from the corresponding interrogation port.

In another example embodiment, the optical detection system described above may also include one or more of the following: further comprising the multi-chamber assay cartridge having: a cartridge body having a sample loading chamber fluidically connected to the reaction chambers via corresponding entry ports; a flexible diaphragm arranged to gate access to the entry ports from the sample loading chamber; and a sample-loading piston valve having a tubular column extending from the cartridge body to an open end for receiving the sample, and a tubular plunger in fluidic communication with the open end of the tubular column and adapted to move therein between an occluded position blocking fluidic access from the open end of the tubular column to the sample loading chamber, and a non-occluded position enabling fluidic access from the open end of the tubular column to the sample loading chamber, and a resiliently biasing member for urging the tubular plunger from the non-occluded position to the occluded position, wherein the flexible diaphragm is arranged to be actuated by the tubular plunger so that actuation of the tubular plunger to the non-occluded position simultaneously actuates the flexible diaphragm to open access to the entry ports, and actuation of the tubular plunger to the occluded position simultaneously actuates the flexible diaphragm to close access to the entry ports; wherein the tubular column is adapted to connect a Luer-Lock-type syringe to the open end, and the tubular plunger is positioned to be actuated from the occluded position to the non-occluded position upon connecting the Luer-Lock-type syringe to the open end; and wherein the cartridge body has a disc-shaped configuration with the reaction chambers arranged in a circular arrangement in the cartridge body surrounding the sample loading chamber in a hub-and-spoke configuration, and wherein the multi-channel optical block has a cylindrical configuration with a cylindrical sidewall between a first end that is the cartridge-interface side and an opposite second end, and the detection channels are arranged in a circular arrangement in the cylindrical sidewall corresponding to the circular arrangement of the reaction chambers.

Another aspect of the present invention includes a multi-chamber assay cartridge comprising: a cartridge body having a plurality of reaction chambers and a sample loading chamber fluidically connected to the reaction chambers via corresponding entry ports, each reaction chamber containing an optical detection reagent and having an optically transparent window for viewing reaction products produced therein; a flexible diaphragm arranged to gate access to the entry ports from the sample loading chamber; and a sample-loading piston valve having a tubular column extending from the cartridge body to an open end for receiving the sample, and a tubular plunger in fluidic communication with the open end of the tubular column and adapted to move therein between an occluded position blocking fluidic access from the open end of the tubular column to the sample loading chamber, and a non-occluded position enabling fluidic access from the open end of the tubular column to the sample loading chamber, and a resiliently biasing member for urging the tubular plunger from the non-occluded position to the occluded position, wherein the flexible diaphragm is arranged to be actuated by the tubular plunger so that actuation of the tubular plunger to the non-occluded position simultaneously actuates the flexible diaphragm to open access to the entry ports, and actuation of the tubular plunger to the occluded position simultaneously actuates the flexible diaphragm to close access to the entry ports.

In another example embodiment, the multi-chamber assay cartridge described above may also include one or more of the following: wherein the tubular column is adapted to connect a Luer-Lock-type syringe to the open end, and the tubular plunger is positioned to be actuated from the occluded position to the non-occluded position upon connecting the Luer-Lock-type syringe to the open end; and wherein the cartridge body has a disc-shaped configuration with the reaction chambers arranged in a circular arrangement in the cartridge body surrounding the sample loading chamber in a hub-and-spoke configuration.

And another aspect of the present invention includes an optical detection method, comprising: providing a multi-chamber assay cartridge having a plurality of reaction chambers each containing an optical detection reagent and a portion of a sample to be tested, and each having an optically transparent window for viewing reaction products produced therein; providing an optical detection system having: a base unit having a cartridge-loading section adapted to receive the cartridge; and an optical detection unit including: a multi-channel optical block having a plurality of detection channels each with an interrogation port on a cartridge-interface side of the multi-channel optical block; a plurality of light sources each optically connected to a corresponding one of the detection channels to transmit an interrogating light beam out through the corresponding interrogation port; a plurality of optic sensors each optically connected to a corresponding one of the detection channels to detect an optical response entering from the corresponding interrogation port; and a detection controller operably connected to control the light sources and the optic sensors; loading the multi-chamber assay cartridge on the cartridge-loading section of the base unit; connecting the optical detection unit to the base unit so that the cartridge-interface side of the multi-channel optical block is juxtaposed with the loaded cartridge, and the interrogation ports of the reaction chambers are optically aligned with the optically transparent windows of the reaction chambers of the loaded cartridge; and upon detecting a trigger event by the detection controller, initializing a detection operation of the optical detection unit, including activating the light sources, so that for each detection channel an interrogating light beam is directed into the reaction chamber to interrogate the reaction products found therein and the optical response from the reaction products is detected by the optic sensor.

In another example embodiment, the optical detection method described above may also include, wherein the trigger event includes detecting that a cartridge is loaded on the cartridge-loading section and the optical detection unit is connected to the base unit.

In another example embodiment, the optical detection method described above may also include one or more of the following: wherein the base unit has a heating element, the cartridge-loading section is adapted to receive the cartridge so that the reaction chambers of the loaded cartridge are in thermal communication with the heating element, and the base unit has a heating controller adapted, upon detecting the trigger event, to activate the heating element and heat the reaction chambers prior to the detection controller initializing the detection operation of the optical detection unit, and wherein the loading step positions the reaction chambers in thermal communication with the heating element; and wherein the trigger event includes detecting that a cartridge is loaded on the cartridge-loading section and the optical detection unit is connected to the base unit.

In another example embodiment, the optical detection method described above may also include one or more of the following: wherein the multi-chamber assay cartridge has: a cartridge body having a sample loading chamber fluidically connected to the reaction chambers via corresponding entry ports; a flexible diaphragm arranged to gate access to the entry ports from the sample loading chamber; and a sample-loading piston valve having a tubular column extending from the cartridge body to an open end for receiving the sample, and a tubular plunger in fluidic communication with the open end of the tubular column and adapted to move therein between an occluded position blocking fluidic access from the open end of the tubular column to the sample loading chamber, and a non-occluded position enabling fluidic access from the open end of the tubular column to the sample loading chamber, and a resiliently biasing member for urging the tubular plunger from the non-occluded position to the occluded position, wherein the flexible diaphragm is arranged to be actuated by the tubular plunger so that actuation of the tubular plunger to the non-occluded position simultaneously actuates the flexible diaphragm to open access to the entry ports, and actuation of the tubular plunger to the occluded position simultaneously actuates the flexible diaphragm to close access to the entry ports, and wherein the step of providing the multi-chamber assay cartridge includes: fluidically connecting a sample-loaded device to the open end of the tubular column so that the tubular plunger is actuated from the occluded position to the non-occluded position to open access to the entry ports; and flowing the sample from the sample-loaded device through the tubular plunger, the sample loading chamber, the entry ports, and into the reaction chambers; and wherein the tubular column is adapted to connect a Luer-Lock-type syringe to the open end, and the tubular plunger is actuated from the occluded position to the non-occluded position by twisting the Luer-Lock-type syringe to fluidically connect to the open end of the tubular column.

These and other implementations and various features and operations are described in greater detail in the drawings, the description and the claims.

BRIEF DESCRIPTION OF THE DRAWINGS

The accompanying drawings, which are incorporated into and form a part of the disclosure, are as follows.

DETAILED DESCRIPTION

Figure 1:
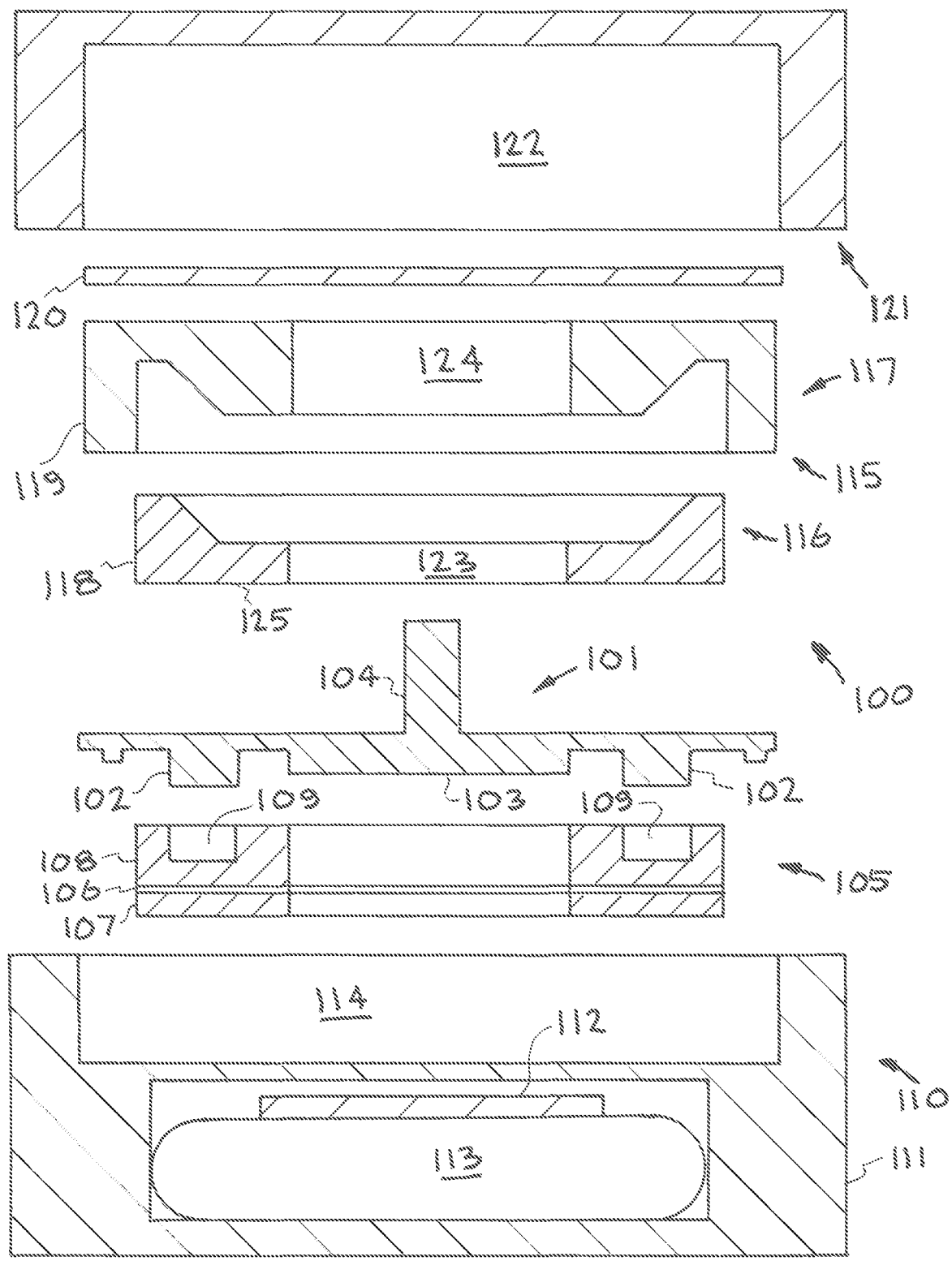
FIG. 1 is a schematic cross-sectional and exploded view of the component parts of an example embodiment of the multi-channel optical detection system of the present invention.
Figure 2:
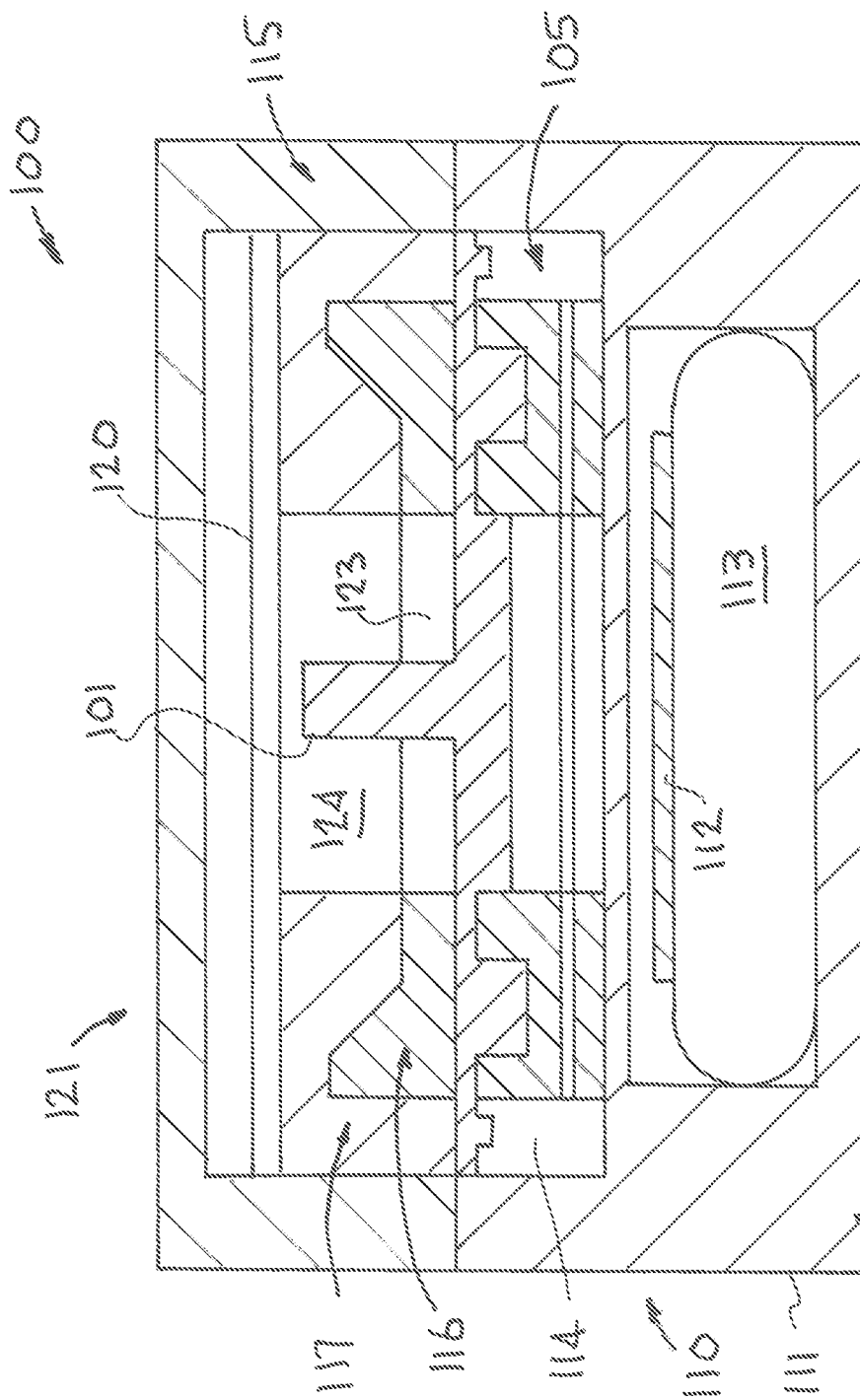
FIG. 2 is a schematic cross-sectional and combined view of the component parts of the example embodiment of the multi-channel optical detection system shown in FIG. 1.

Turning now to the drawings, FIGS. 1 and 2 show schematic views of an exemplary embodiment of the multi-channel optical detection system of the present invention, generally indicated at reference character 100, and having a base unit 110, a multi-chamber assay cartridge 101, and a multi-channel optical detection unit, comprising 115, 120, and 121. In particular, FIGS. 1 and 2 show exploded and combined views, respectively, of the optical detection system 100. It is appreciated that while the multi-chamber assay cartridge 101 is shown as part of the system, the system may in the alternative be characterized as only the base unit and the optical detection unit.

In FIGS. 1 and 2, the base unit 110 is shown having a base housing 111, a heating controller 112 (e.g. a heater control circuit board), a battery 113, and a heating element 105, with the battery (e.g. rechargeable) and heating controller positioned in and carried by the base housing, and the heating element 105 positioned in cavity 114 and also carried by and protected within the base housing. The heating element 105 is shown having a Kapton heater 106 sandwiched between a thermally conductive upper plate 108 (e.g. copper) and a lower plate 107, with heating wells 109 formed on the upper plate. The Kapton heater 106 is operably connected to be controlled by the heating controller to generate heat and thereby heat the upper plate and the heating wells. And the multi-chamber assay cartridge 101 is shown having a tubular column 104 extending from a central hub 103 of the cartridge, and having reaction chambers, such as 102, radially spaced from the central hub. The reaction chambers are shown aligned with the corresponding heating wells 109 of the heating element 105 of the base unit so that they may be seated in the heating wells and mounted on the base unit. And the optical detection unit is shown including an upper housing (or lid) 121 having a cavity 122, a detection controller (or control board) shown as a printed circuit board 120, and a multi-channel optical block 115 having a two-piece construction: a lower block 116 and an upper block 117. The multi-channel optical block 115 may have a generally cylindrical configuration, with the lower section 116 having an inner cylindrical wall 118 surrounding a center cavity 123, and the upper section 117 having an outer cylindrical wall 119 surrounding a center cavity 124, and which are mateably configured to join together as a single cylindrical wall, as seen in FIG. 2. Additionally, the lower section 116 has a cartridge-interface side 125 where the plurality of interrogation ports (not shown in FIG. 2) are located.

Figure 3:
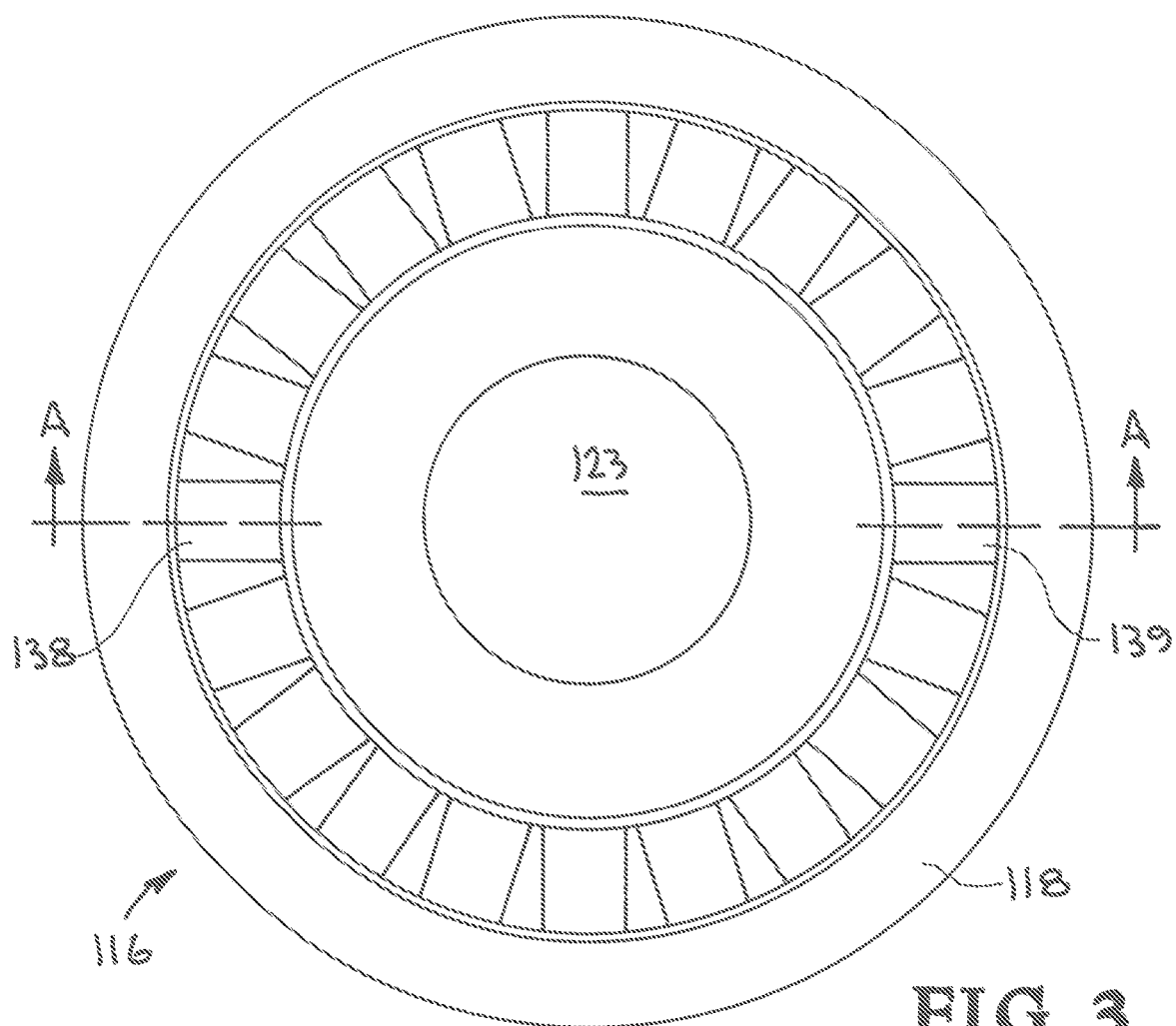
FIG. 3 is a plan view of a lower section of an example embodiment of a multi-channel optical block having a two-piece construction.
Figure 4:
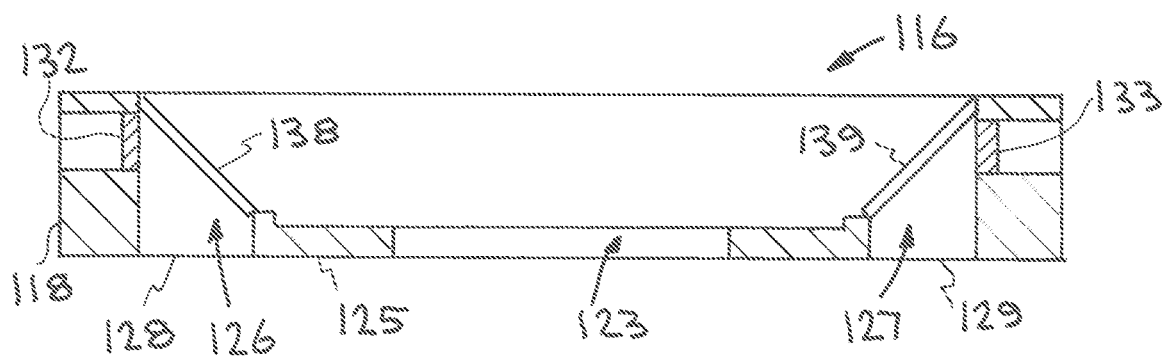
FIG. 4 is a cross-sectional view of the lower section of the example embodiment of a multi-channel optical block shown in FIG. 3 taken along line A-A.
Figure 5:
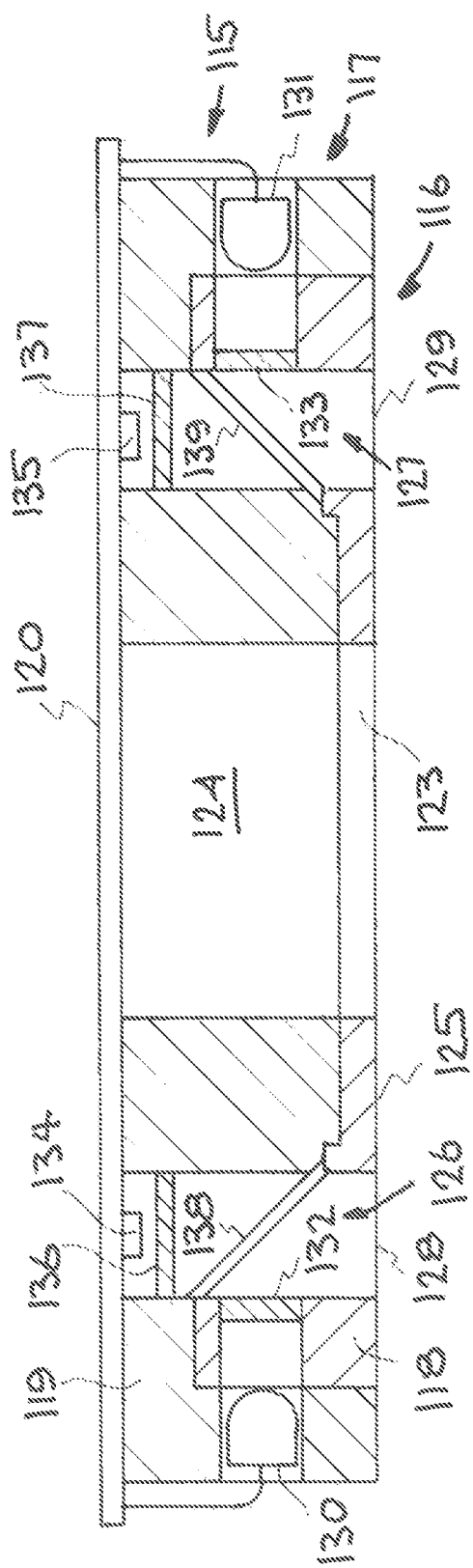
FIG. 5 is a cross-sectional view of an example embodiment of a multi-channel optical block having a two-piece construction.

FIGS. 3-5 show details of the two-piece multi-channel optical block 115 shown in FIGS. 1 and 2. In particular, FIG. 3 is a plan view of only the lower section 116 of the multi-channel optical block having a two-piece construction, similar to that shown in FIGS. 1 and 2. FIG. 4 is a cross-sectional view of the lower section 116 shown in FIG. 3 taken along line A-A. And FIG. 5 is a cross-sectional view of an example embodiment of a multi-channel optical block shown with its two-piece construction assembled, and connected with the detection controller board 120. As shown in FIG. 3-5 the lower section 116 has a cylindrical configuration having a cylindrical wall 118, a cartridge-interface side 125, and detection channels (e.g. 126, 127) arranged in a circular arrangement in the cylindrical wall 118 and around the cavity 123. In FIG. 3, the detection channels are also shown having optical filters, such as excitation filters 132, 133, positioned in a radial direction, dichroic mirrors (e.g. 138, 139), and interrogation ports (e.g. 128, 129) on the cartridge interface side 125. And FIG. 5 in particular shows the lower section 116 assembled together with the upper section 117 of the optical detection block 115, to form the complete detection channels. In particular, the upper section 115 is shown having a cylindrical wall 119 where light sources 130, 131 are mounted. Optic sensors (e.g. 134, 135) are shown mounted on the detection controller board 120 and positioned at an upper end of the detection channels 126, 127. And emission filters (e.g. 136, 137) are positioned upstream of the optic sensors and in the detection channels. And finally, the light sources 130, 131 are shown positioned to direct light beams in a radially inward direction toward the dichroic mirrors (138, 139), and operably connected to be powered by the detection controller board 120.

Figure 7:
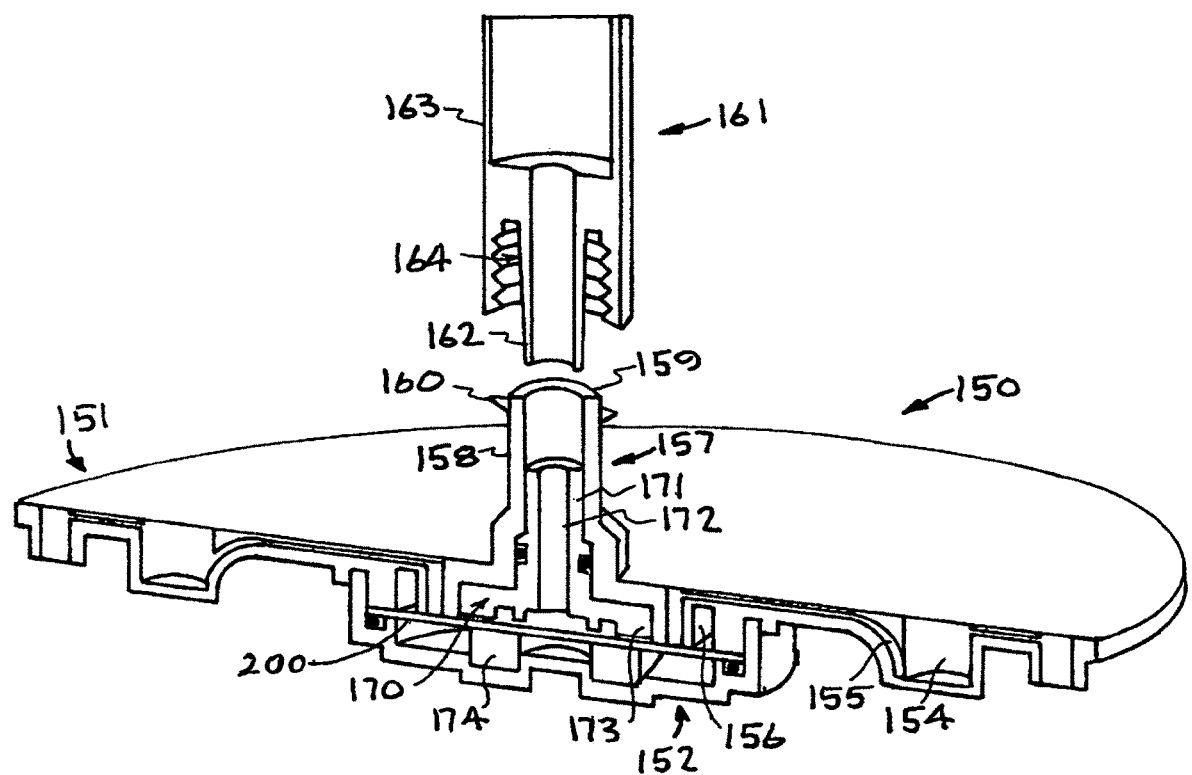
FIG. 7 is a cross-sectional view of an example embodiment of the multi-chamber assay cartridge of the present invention having a sample-loading piston valve in an occluded position.
Figure 8:
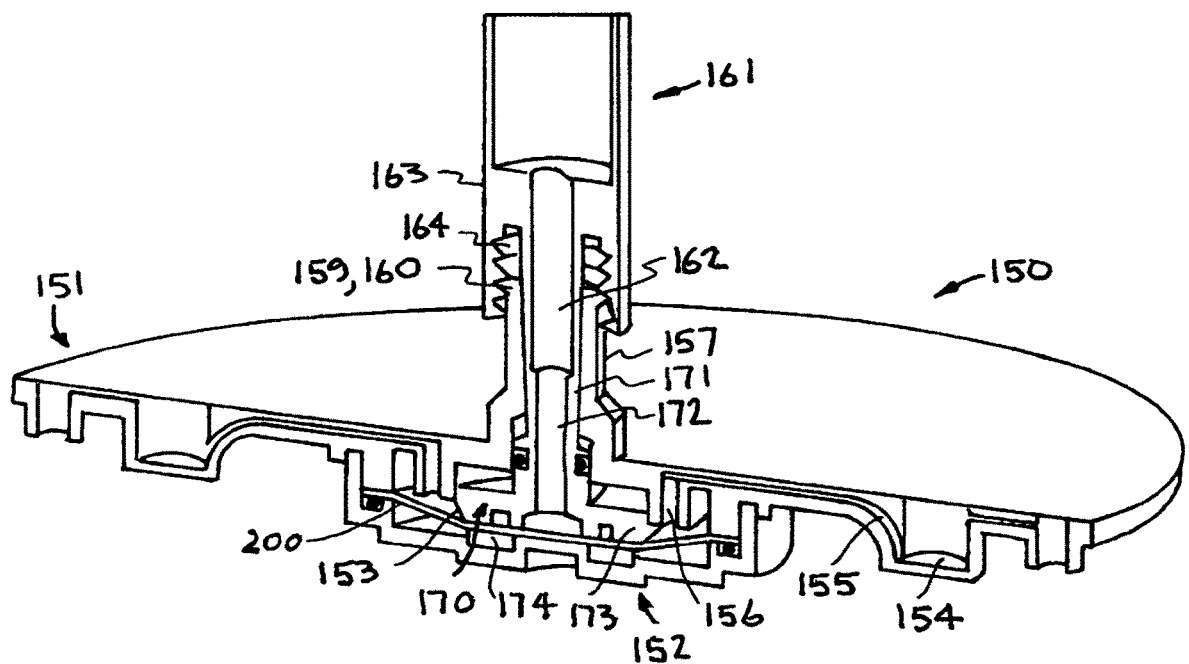
FIG. 8 is a cross-sectional view of the example embodiment of the multi-chamber assay cartridge shown in FIG. 7 after a Luer-Lock-type syringe is fluidically connected to the sample-loading piston value to actuate the tubule plunger to a non-occluded position.

FIGS. 7 and 8 together show a sample loading sequence of an example embodiment of a multi-chamber array cartridge of the present invention, generally indicated at 150. FIG. 7 in particular is a cross-sectional view of the multi-chamber assay cartridge having the sample-loading piston valve 157 in an occluded position. And FIG. 8 is a cross-sectional view of the multi-chamber assay cartridge shown in FIG. 7 after a Luer-Lock-type syringe 161 is fluidically connected to the sample-loading piston valve 157 to actuate the tubule plunger 172 to a non-occluded position.

The multi-chamber array cartridge is shown having a cartridge body 151 with a disc shape and multiple reaction chambers e.g. 154 arranged in a circular arrangement around a central hub 152 and a centrally located sample loading port 157 at the central hub. The sample loading port 157 is shown as a piston valve and having a tubular column 158 extending centrally from the cartridge body 151 to an open end 159. As shown in FIGS. 7 and 8, the tubular column 158 at the open end 159 is configured as a female Luer Lock fitting and is adapted to mateably receive through the open end and sealably connect with a tapered nozzle 162 of a male Luer Lock fitting of a Luer Lock syringe 161. The open end is shown having an annular flange 160 or male thread for engaging the female thread 164 of a locking collar/ring 163 of the Luer lock syringe. And a cap (not shown) may be provided to cover the open end of the tubular pillar prior to use.

The tubular plunger 170 of the sample-loading piston valve is adapted to control fluidic communication through the sample-loading piston valve 157, and is shown in FIGS. 7 and 8 as a tubular plunger having an elongated tubular shank portion 171 with a fluidic conduit 172 therein, that is positioned in the tubular column 158 with an opening 159 at a first end of the shank portion, and a head portion 173 connected at a second opposite end of the elongated shank portion and positioned within the cartridge body 151 adjacent the sample loading chamber 153 in the central hub 152. And a fluidic channel(s) extends through the tubular plunger, from the opening at the first end of the elongated shank portion, through the elongated shank portion and the head portion, and finally to one or more output ports on the head portion. The piston-valve is adapted to move in reciprocating fashion as a piston-cylinder arrangement, between a first position occluding the output ports, i.e. closed position which occludes fluid communication to the reaction chambers to seal contents therein, and a second non-occluding position, i.e. open position.

In FIGS. 7 and 8, a flexible diaphragm 200, e.g. silicon diaphragm, is also shown provided in a central sample loading chamber 153 of the cartridge between the plunger head (head portion) 173 and a resiliently biasing member, such as a foam sponge 174, which urges the tubular plunger in an upward direction. The flexible diaphragm 200 is arranged to occlude entry into the entry ports 156 of the fluidic channels leading to the reaction chambers, e.g. 154, via connecting channels, e.g. 155, when the piston-valve is also in the occluded/closed position. The flexible diaphragm is positioned between the head portion of the piston valve and a resiliency biasing member which is provided and arranged to urge the piston-valve and the flexible diaphragm into their respective occluded/closed positions when a sample loading device is not connected the sample loading port. As shown in FIGS. 7 and 8, the resiliently biasing member may be, for example, a compressible foam pad that is located below the silicon diaphragm. The foam pad acts as a spring and could be represented by a polymeric sponge, coiled spring, a wave spring, a poly-wave spring, a multi-wave disc spring, or any other resiliently biasable or resiliently deformable device that will return to its original shape and size upon release of the incident pressure.

Figure 6:
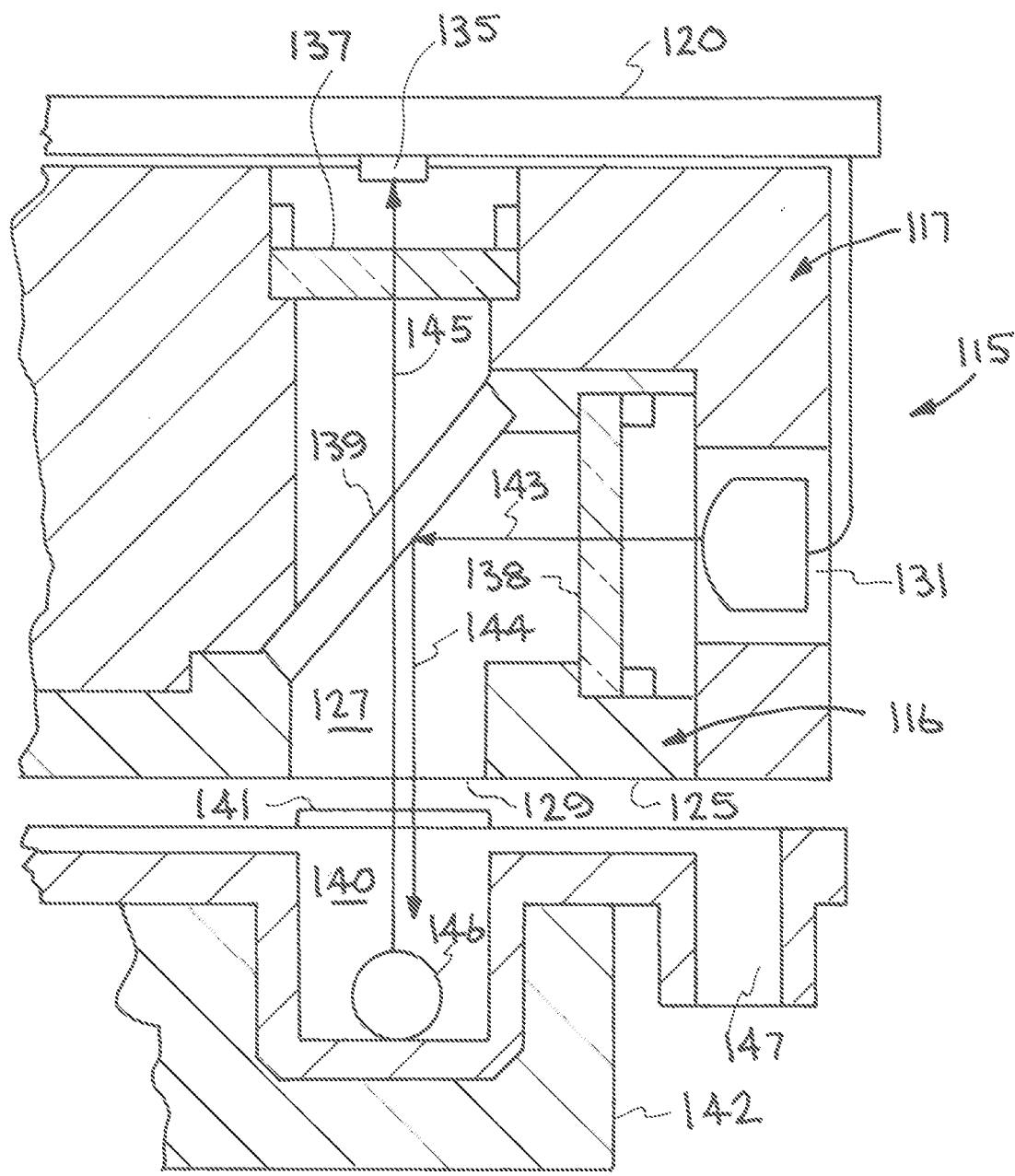
FIG. 6 is a cross-sectional view of a representative detection channel of an example embodiment of the multi-channel optical block interrogating the contents of a reaction chamber to induce an optical response.

FIG. 6 is a cross-sectional view of a representative detection channel 127 of an example embodiment of the multi-channel optical block 115 interrogating the contents of a reaction chamber 140 with interrogating light 144 produced by a light source 131 to induce an optical response 145 detected by an optic sensor 135, and illustrates the general concept of an optical detection unit of the present invention using a plurality of detection channels, e.g. filter cubes, for illuminating the reaction wells with a light source and detecting an optical response therefrom. In particular, FIG. 6 shows a representative optical detection path through a detection channel of the optical block 115 having the optical detection unit control board 120 (with optical sensors 135) positioned over the optical block. As shown, the optical detection channel 127 utilizes its own light source 131 and light-to-digital sensor 135. The excitation filter 138, dichroic beam splitter 139, emission filter 137, and a focusing lenses (not shown), if needed, are mounted in the detection channel. As shown, the interrogation port 129 of the detection channel 127 is optically aligned with the optically transparent window 141, so that the excitation light beam 143 is directed at the dichroic mirror and reflected into the reaction chamber 140 containing a sample and its reaction products 146. An optical response 145 emitted by the sample and its reaction products is then emitted so as to be detected by the optic sensor 135 aligned directly over the reaction chambers at the end of the light path. Focusing lenses may also be provided and located on the cartridge side of each detection channel below the dichroic mirror to improve light detection by the sensor. The reaction chamber 140 is also shown seated in a heating well 142 of the base unit where it can be heated, and a foam vent chamber 147 is also shown.

Figure 9:
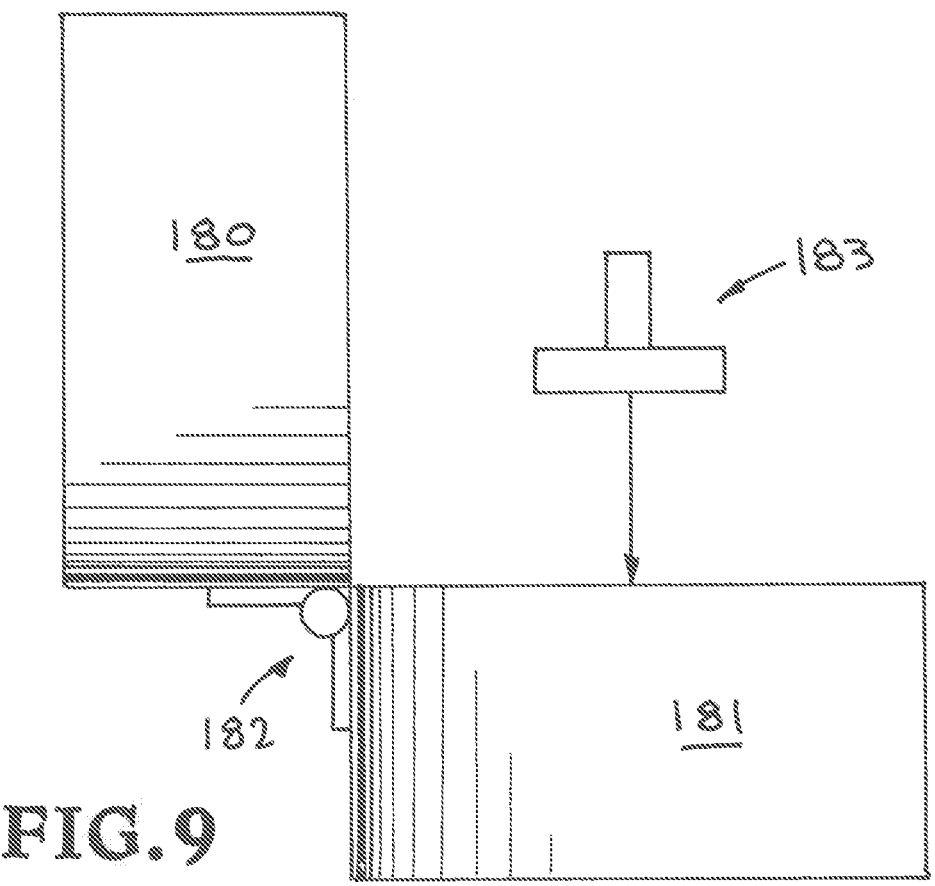
FIG. 9 is a schematic view and example embodiment of the optical detection system of the present invention having the optical detection unit hinged to the base unit, and shown in an open position.
Figure 10:
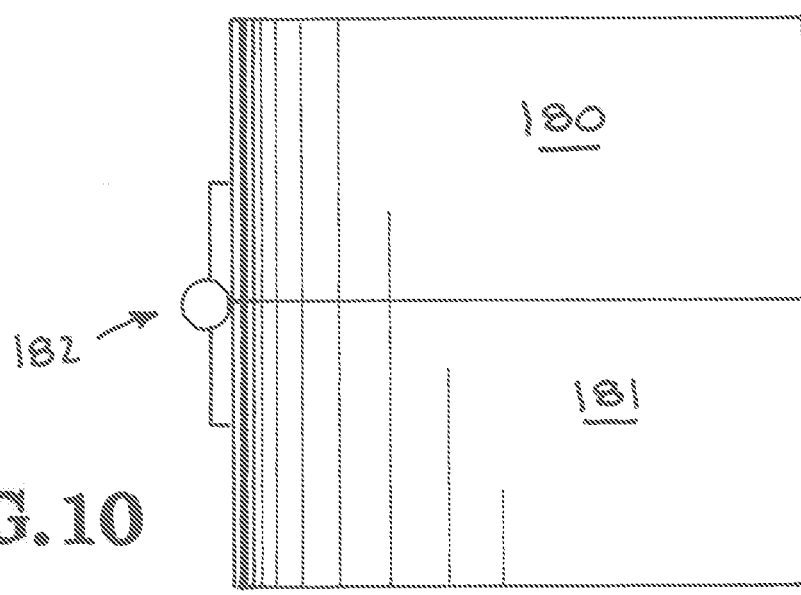
FIG. 10 is a schematic view and example embodiment of the optical detection system shown in FIG. 9 shown in a closed position.

FIGS. 9 and 10 together show an example connection sequence between an optical detection unit and a base unit of an example embodiment of the optical detection system of the present invention. In particular, FIG. 9 is a schematic view and example embodiment of the optical detection system having the optical detection unit 180 hinged by a hinge mechanism 182 to the base unit 181, and shown in an open position. And FIG. 10 is a schematic view and example embodiment of the optical detection system shown in FIG. 9 shown in a closed position. Activation of the system to initialize detection operation may be triggered by loading the cartridge 183 into the base unit 181, and subsequently closing the lid portion of the optical detection unit 180 over the base unit 181 to connect together.

In a representative example application, the optical detection system of the present uses loop-mediated isothermal nucleic acid amplification (LAMP) assays stabilized in a disposable assay detection cartridge and a battery-powered heating and fluorescence detection platform to perform real time identification, such as where the sample-to-answer time is approximately 30 minutes. In this case, samples are diluted into reaction buffer containing positive control DNA and injected into the cartridge where it is distributed into a plurality of reaction chambers or wells. A cartridge-mounting section of the base unit of the system is adapted to receive the cartridge so that each reaction chamber or well is aligned with its own optical path and optic sensor for fluorescence detection. The system and amplification reaction is initiated by loading a sample-loaded cartridge on the cartridge mounting section detection system and connecting the optical detection unit on the base unit, e.g. by closing a lid of the optical detection unit over the base unit. A detection algorithm programmed into digital controllers and processors then analyzes the fluorescence signal data to determine positive reactions. The system displays the results on an onboard display in an easy-to-read format and stores the data onboard for later analysis and download via USB or Bluetooth.

Upon startup (what triggers startup?) and prior to heating, the control software performs several system checks. 1. The system confirms if sufficient power in the battery to complete the run. 2. The system then checks that the light sources and sensors function (operational). Once these system checks are completed, the heating step initiates. The heater reaches a designated temperature offset (higher??) from the reaction temperature to correct for heat loss between the copper heater, the polycarbonate cartridge and the liquid sample. Once the designated temperature is reached, the control software begins collecting fluorescence data to track DNA amplification. The fluorescence signal for each well is measured every 6-10 seconds for the full thirty-minute reaction. All fluorescence signal data is stored on the control board. Data analysis for fluorescence determination—Starting five minutes into the reaction, each reaction well data set is analyzed to determine if a reaction shows positive amplification. A three-minute moving average window is used to determine the average fluorescence signal. A positive reaction is determined when 10 consecutive fluorescence readings are greater than the moving average plus two standard deviations. At this point the software turns the display indicator box for the positive assay red. At the termination of the 30-minute reaction time, all negative sample indicator boxes turn green. The display also indicates if a reaction is positive, negative or failed due to a control reaction issue. An electronic display may be provided as part of the optical detection unit for displaying the measured optical response (e.g. fluorescence) from the reaction chambers. On/off operation—The system remains on until the lid is opened at which point the system turns off.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

We claim:
1. An optical detection system, comprising:
a multi-chamber assay cartridge having:
a cartridge body having a plurality of reaction chambers and a sample loading chamber fluidically connected to the reaction chambers via corresponding entry ports,
wherein the reaction chambers are radially arranged around the sample loading chamber in a hub-and-spoke configuration, and each reaction chamber contains an optical detection reagent and having an optically transparent window for viewing reaction products produced therein;
a flexible diaphragm arranged to gate access to the entry ports from the sample loading chamber and moveable between a closed position occluding the entry ports and an open position allowing access to the entry ports;
a resiliently biasing member positioned to urge the flexible diaphragm to the closed position;
a tubular column extending from a center of the cartridge body in an orthogonal direction to the hub-and-spoke configuration of the reaction chambers to an open end for receiving a sample; and
a tubular plunger positioned in the tubular column and having a fluidic conduit enabling fluidic communication between the open end of the tubular column and the sample loading chamber, and adapted to reciprocate in the tubular column between a first position which does not resiliently bias the flexible diaphragm from the closed position, and a second position which resiliently biases the resiliently biasing member and actuates the flexible diaphragm to the open position,
wherein the tubular column is adapted to connect a Luer-Locke syringe to the open end, and the tubular plunger is configured to be actuated by the syringe to the second position when the syringe is connected to the open end, whereby
connecting the syringe to the open end simultaneously enables fluidic access and
sample loading from the open end of the tubular column into the reaction chambers;
a base unit having a cartridge-loading section with a plurality of heating wells each adapted to receive a corresponding one of the plurality of reaction chambers of the cartridge in a parallel direction to a longitudinal axis of the tubular column of the cartridge; and
an optical detection unit including: a multi-channel optical block having a plurality of detection channels each with an interrogation port on a cartridge-interface side of the multi-channel optical block and a center cavity for receiving the tubular column; a plurality of light sources each optically connected to a corresponding one of the detection channels to transmit an interrogating light beam out through the corresponding interrogation port; a plurality of optic sensors each optically connected to a corresponding one of the detection channels to detect an optical response entering from the corresponding interrogation port; and a detection controller operably connected to control the light sources and the optic sensors,
wherein the optical detection unit is adapted to connect to the base unit in a parallel direction to the longitudinal axis of the tubular column of the multi-chamber assay cartridge so that the cartridge-interface side of the multi-channel optical block is juxtaposed with the loaded cartridge, and for each detection channel the interrogation port is optically aligned with the optically transparent window of a corresponding one of the reaction chambers of the loaded cartridge and, upon activation of the light source, the interrogating light beam is directed into the reaction chamber to interrogate reaction products found therein and the optical response from the reaction products is detected by the optic sensor, and
wherein the detection channels are radially arranged in the multi-channel optical block in a hub-and spoke configuration around the center cavity corresponding to the radially arranged hub-and-spoke configuration of the reaction chambers in the cartridge.

2. The optical detection system of claim 1,
wherein the multi-channel optical block has a cylindrical configuration with a cylindrical sidewall between a first end that is the cartridge-interface side and an opposite second end.

3. The optical detection system of claim 2,
wherein the optical detection unit includes a plurality of dichroic mirrors each arranged in a corresponding one of the detection channels to reflect the interrogating light beam from the light source out through the interrogation port, and to transmit the optical response entering from the interrogation port to the optic sensor, and
wherein the light sources are arranged to direct the interrogating light beam in a radially inward direction toward the plurality of dichroic mirrors, and the optic sensors are arranged to receive the optical response in an orthogonal direction to the interrogating light beam.

4. The optical detection system of claim 1,
wherein the detection controller is adapted to initialize a detection operation of the optical detection unit, including activating the light sources, upon detecting a trigger event.

5. The optical detection system of claim 4,
wherein the trigger event includes detecting that the cartridge is loaded on the cartridge-loading section and the optical detection unit is connected to the base unit.

6. The optical detection system of claim 4,
wherein the base unit has a heating controller adapted, upon detecting the trigger event, to activate the heating wells and heat the reaction chambers prior to the detection controller initializing the detection operation of the optical detection unit.

7. The optical detection system of claim 6,
wherein the trigger event includes detecting that the cartridge is loaded on the cartridge-loading section and the optical detection unit is connected to the base unit.

8. The optical detection system of claim 1,
wherein the optical detection unit includes a plurality of excitation filters each optically connected to a corresponding one of the detection channels downstream of the corresponding light source to transmit excitation light of a predetermined fluorescence-inducing wavelength range out through the corresponding interrogation port, and a plurality of emission filters each optically connected to a corresponding one of the detection channels upstream of the corresponding optic sensor to detect fluorescent light of a predetermined fluorescence wavelength range entering from the corresponding interrogation port.

9. The optical detection system of claim 1,
wherein the cartridge body has a disc-shaped configuration with the reaction chambers arranged in a circular arrangement in the cartridge body surrounding the sample loading chamber in the hub-and-spoke configuration, and
wherein the multi-channel optical block has a cylindrical configuration with a cylindrical sidewall between a first end that is the cartridge-interface side and an opposite second end, and the detection channels are arranged in a circular arrangement in the cylindrical sidewall corresponding to the circular arrangement of the reaction chambers.

10. A multi-chamber assay cartridge comprising:
a cartridge body having a plurality of reaction chambers and a sample loading chamber fluidically connected to the reaction chambers via corresponding entry ports, wherein the reaction chambers are radially arranged around the sample loading chamber in a hub-and-spoke configuration, and each reaction chamber contains an optical detection reagent and having an optically transparent window for viewing reaction products produced therein;

a flexible diaphragm arranged to gate access to the entry ports from the sample loading chamber and moveable between a closed position occluding the entry ports and an open position allowing access to the entry ports;

a resiliently biasing member positioned to urge the flexible diaphragm to the closed position;

a tubular column extending from a center of the cartridge body in an orthogonal direction to the hub-and-spoke configuration of the reaction chambers to an open end for receiving a sample; and a tubular plunger positioned in the tubular column and having a fluidic conduit enabling fluidic communication between the open end of the tubular column and the sample loading chamber, and adapted to reciprocate in the tubular column between a first position which does not resiliently bias the flexible diaphragm from the closed position, and a second position which resiliently biases the resiliently biasing member and actuates the flexible diaphragm to the open position, wherein the tubular column is adapted to connect a Luer-Lock syringe to the open end, and the tubular plunger is configured to be actuated by the syringe to the second position when the syringe is connected to the open end, whereby connecting the syringe to the open end simultaneously enables fluidic access and sample loading from the open end of the tubular column into the reaction chambers.

11. The multi-chamber assay cartridge of claim 10, wherein the cartridge body has a disc-shaped configuration with the reaction chambers arranged in a circular arrangement in the cartridge body surrounding the sample loading chamber in the hub-and-spoke configuration.

\* \* \* \* \*